RONALD E. CARLSON
MILBURN L. HART
INVENTORS

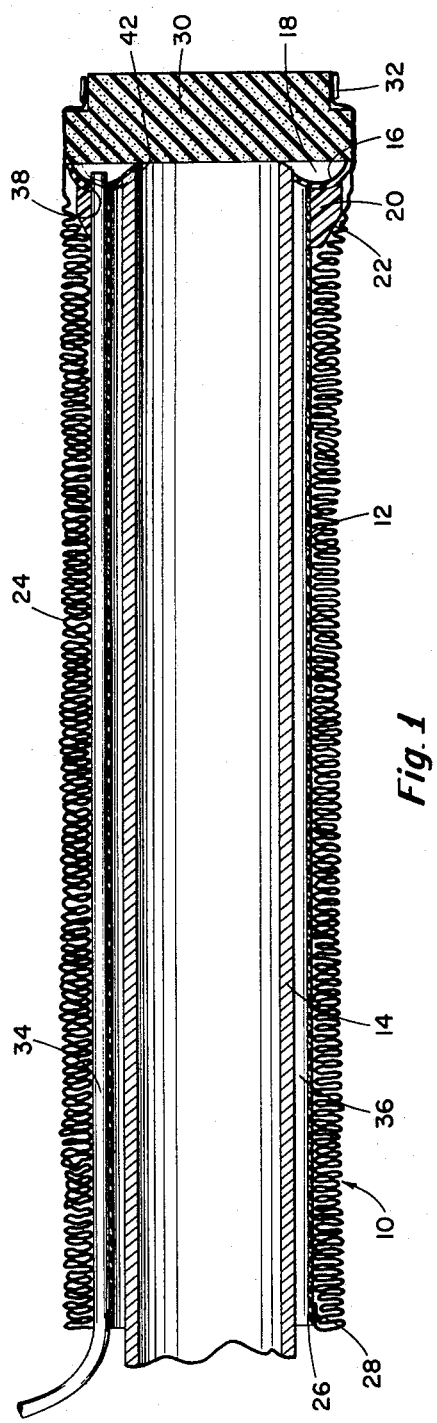
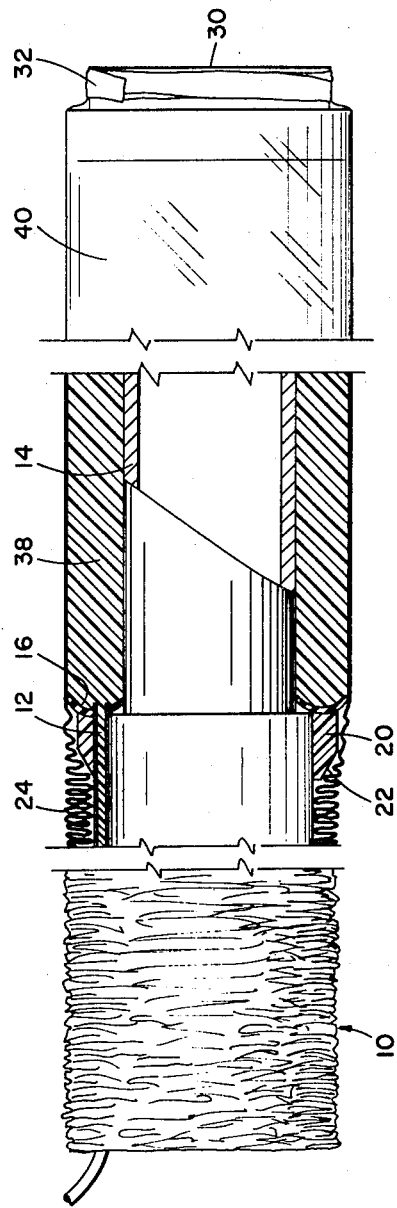

BY William S. Dorman
ATTORNEY

Jan. 9, 1973   R. E. CARLSON ETAL   3,709,751
PIPE INSULATING METHOD AND APPARATUS
Filed Feb. 1, 1971   3 Sheets-Sheet 3
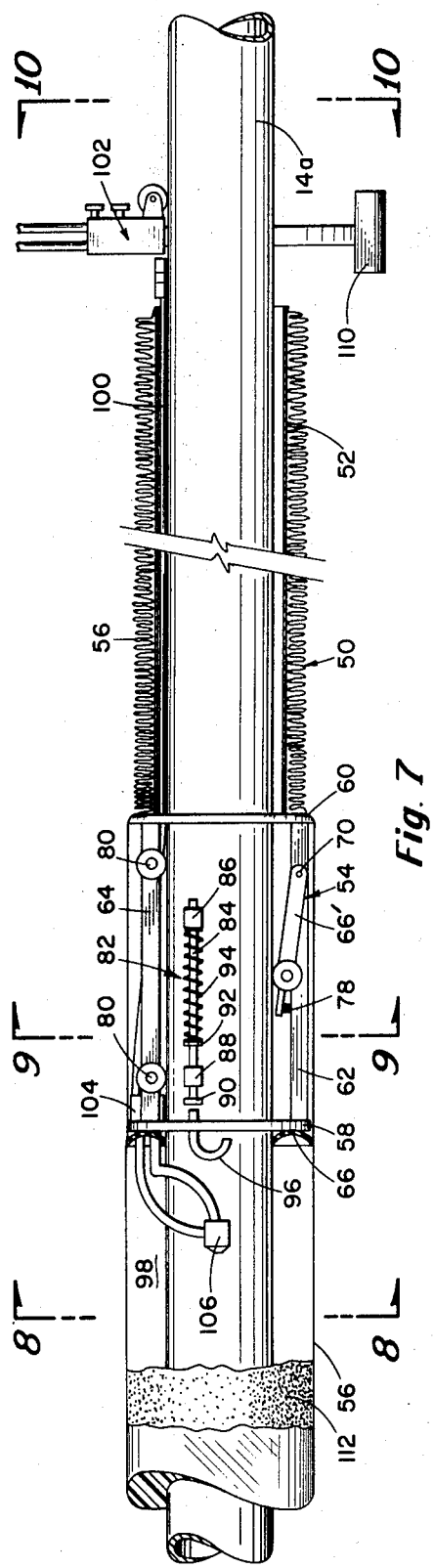
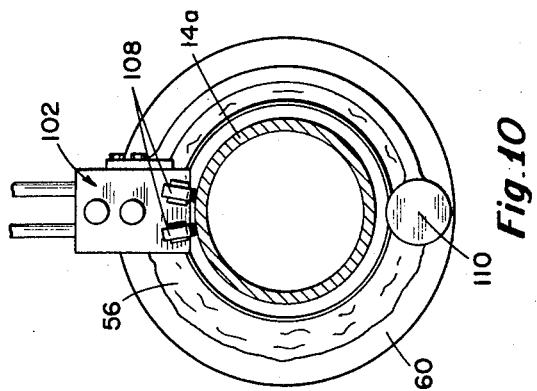
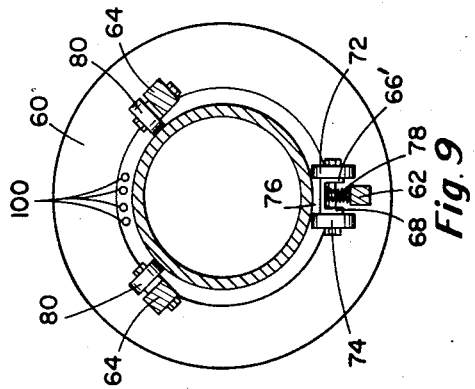
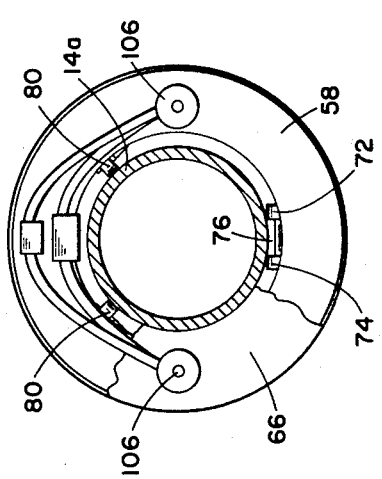
RONALD E. CARLSON
MILBURN L. HART
INVENTORS
BY William S. Dorman
ATTORNEY United States Patent Office 3,709,751
Patented Jan. 9, 1973

3,709,751
PIPE INSULATING METHOD AND APPARATUS
Ronald E. Carlson and Milburn L. Hart, both of 5937 E.
Admiral Place, Tulsa, Okla. 74003
Filed Feb. 1, 1971, Ser. No. 111,480
Int. Cl. B32b 5/20, 31/06
U.S. Cl. 156—78                    14 Claims

ABSTRACT OF THE DISCLOSURE

A method and apparatus for applying a foam insulation around the outer periphery of a pipe while simultaneously providing an outer seamless sleeve or jacket around the applied foam insulation. The method and apparatus applies the foam and jacket at the site of the installation of the pipe, such as in a pipe line, or the like.

This invention relates to improvements in pipe insulating method and apparatus and more particularly, but not by way of limitation, to a method and means for applying a foam insulation around the outer periphery of a pipe and simultaneously providing an outer seamless sleeve over the applied foam insulation.

It is usually necessary to insulate the outer periphery of a pipe line, and the like, and it is further necessary or desirable to provide an outer jacket around the insulation material for protection thereof. The most common methods of insulating a pipe line in use today comprises transporting of individual pipe sections to a mill, or the like; applying the insulation material to the outer periphery of the individual pipe sections at the mill site; transporting the insulated pipe sections to the site of the pipe line or other use of the pipe; connecting the insulated pipe sections in end to end or tandem relation; and wrapping the outer periphery of the pipe with a suitable covering material to provide an outer jacket therefor. This has many disadvantages in that it is expensive to transport the pipe sections to and from the mill, and transporting of the insulated pipe frequently results in damage to the insulation material. In addition, the wrapping of the pipe creates a problem in sealing of the edges of the wrapping material to provide a substantially complete barrier for the insulated pipe.

The present invention contemplates a novel method and apparatus for insulating a pipe line, or the like, at the site of the installed pipe, and simultaneously covering the insulated pipe with a seamless plastic sleeve to provide a substantially impervious barrier around the outer periphery of the insulated pipe. The novel apparatus comprises a relatively short expendable mandrel adapted to be disposed longitudinally over the installed pipe and having an annular head member at one end thereof, with a substantially great length of plastic film tubing disposed around the outer periphery thereof and which is substantially accordian pleated in the initial position thereof. One end of the plastic sleeve or tubing is disposed around the outer periphery of the head member and is anchored to an adjacent pipe section prior to the insulation operation. The other end of the plastic sleeve is secured around the outer extremity of the mandrel. The head member is in sealing engagement with the outer periphery of the pipe, and passageway means extends along the length of the unit between the mandrel and plastic sleeve to provide communication between the exterior of the unit and the open end of the head. The components of a suitable foam insulating material, such as the polyurethane type foam, are directed through the passageway means and discharged in the area or volume at the open end of the head member. The foam material "sets up" very quickly and fills the annular chamber around the pipe. As the area fills with the foam insulation, a continued application of the foam to the area creates an increase in pressure in the area which causes the head member and mandrel to move longitudinally along the pipe as the foam accumulates around the pipe for insulation of the outer periphery thereof. As the mandrel moves along the pipe, the end plastic sleeve is pulled simultaneously therewith for unfolding of the sleeve and pulling the sleeve snugly over the outer periphery of the foam being applied around the pipe. The operation is continued until the entire length of the plastic sleeve has been unfolded, and the forward movement of the mandrel is thus stopped. The application of the foam ingredients is then ceased, and the expendable mandrel may be cut off the pipe and discarded. When the unit has completed this coating operation, another unit may be utilized similarly for continuing the operation along the entire length of the pipe line. It is to be understood that a plurality of the units have been installed along the pipe line at spaced intervals during the installation of the pipe line. Of course, the adjacent ends of the plastic sleeves of succeeding units may be suitably sealed together in any well known manner, and the pipe is provided with an efficient foam insulation having a seamless plastic sleeve thereover for protection thereof.

It is an important object of this invention to provide a method and means of providing insulation around the outer periphery of a pipe while simultaneously covering the applied insulation with a seamless outer sleeve.

Another object of this invention is to provide a novel method and apparatus for applying a foam type insulation and outer sleeve therefor around the outer periphery of a pipe at the site of the installation of the pipe.

Still another object of this invention is to provide a novel method and apparatus for insulating a pipe line and simultaneously providing an outer jacket for the insulation which is particularly designed and constructed for economy of application of the insulation and protection sleeve to the outer periphery of a pipe line.

Other and further objects and advantageous features of the present invention will hereinafter more fully appear in connection with a detailed description of the drawings in which:

FIG. 1 is a sectional elevational view of a pipe insulating apparatus embodying the invention and disposed on a pipe at the beginning of an insulating operation.

FIG. 2 is a broken elevational view, partly in section, of a pipe insulating apparatus as shown in FIG. 1 and depicting the apparatus during an insulating operation.

FIG. 7 is an elevational view partly in section of a modified insulating apparatus embodying the invention and disposed on a pipe for depicting one stage of an insulating operation.

FIG. 8 is a view taken on line 8—8 of FIG. 7 with portions thereof cut away and eliminated for purposes of illustration.

FIG. 9 is a view taken on line 9—9 of FIG. 7.

FIG. 10 is a view taken on line 10—10 of FIG. 7.

Figure 3:
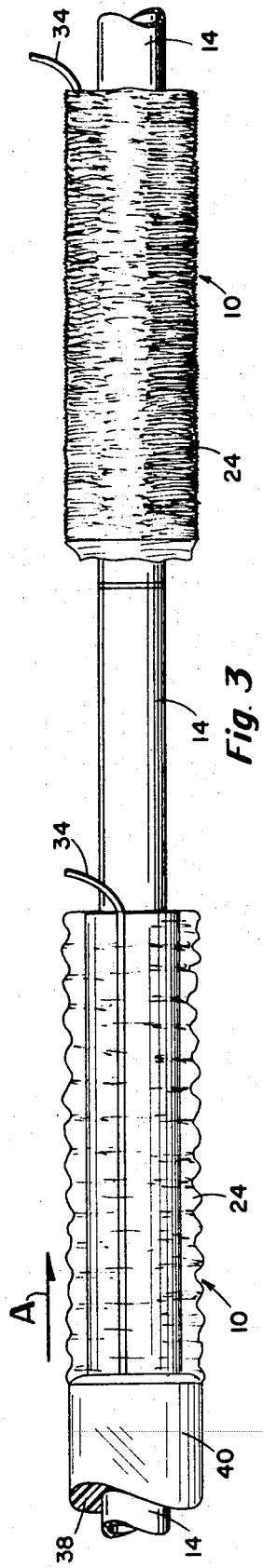
FIG. 3 is an elevational view of a portion of a pipe line having two consecutive insulating devices disposed thereon and depicting one stage of an insulating operation.

Referring to the drawings in detail, and particularly FIGS. 1 and 2, reference character 10 generally indicates a pipe insulating apparatus comprising a sleeve or mandrel 12 constructed of any suitable expendable material, such as cardboard or the like, of a size for readily receiving a pipe 14 therethrough. An annular head member 16 is provided at one end of the mandrel 12 and is constructed from a suitable flexible material such as rubber, or the like. The cross-sectional configuration of the ring or head member 16 is preferably substantially concave, as shown in the drawings, to provide an annular chamber 18 around the outer periphery of the pipe 14 and in communication with the head 16 for a purpose as will be hereinafter set forth. The inner periphery of the head 16 is in sealing engagement with the outer periphery of the pipe 14. The head 16 may be secured to the mandrel 12 in any suitable manner and as shown herein is secured thereto by an annular stiffening ring 20 which is suitably secured between the head 16 and outer periphery of the mandrel 12. The ring 20 may be provided with a tapered leading portion 22 oppositely disposed from the head member 16 for a purpose as will be hereinafter set forth.

A plastic tubular film 24 is disposed around the outer periphery of the mandrel 12 and is of a diameter considerably greater or larger than the outer diameter of the mandrel 12 for a purpose as will be hereinafter set forth. The tube 24 is preferably constructed of seamless thin mil type plastic film, but not limited thereto, and whereas the overall length of the mandrel 12 is relatively short, the overall length of the sleeve or tube 24 is relatively long. For example, the mandrel 12 may be approximately two and one half feet in length, and the tube 24 may be approximately two hundred feet in length. One end of the tube 24 is secured around the outer periphery of the mandrel 12 in the proximity of the outer end 26 thereof in any suitable manner, and as shown herein is secured therearound by a suitable adhesive or pressure sensitive type tape 28. The opposite end of the tube 24 is disposed around the outer periphery of the head member 16 but is not permanently secured thereto. Whereas the tube 24 may be temporarily secured to the head 16 as will be hereinafter set forth, the head 16 is in sealing engagement with the inner periphery of the tube 24 but is free to move longitudinally within the sleeve 24 during operation of the apparatus 10 as will be hereinafter set forth in detail. It will be apparent that the excessive length of the sleeve 24 with respect to the length of the mandrel 12 will cause the sleeve to fold around the mandrel between the other end 26 thereof and the head 16 in a manner of an accordion.

The particular unit 10 depicted in FIGS. 1 and 2 is the type utilized at the beginning of a pipe insulating operation and consequently an end closure member 30 is disposed adjacent the head member 16 for enclosing one end of the chamber 18. The end of the tube 24 disposed around the head 16 is secured around the outer periphery of the head 16 in any suitable manner, and as shown herein may be secured thereto by a suitable adhesive or pressure sensitive tape 32. The end closure disc or plate 30 is preferably constructed of a relatively soft type material, such as expanded plastic foam, or the like, for a purpose as will be hereinafter set forth. The succeeding units 10 disposed around the pipe 14 to be utilized in the continuing insulating operation are not provided with the end closure plate 30.

A plastic tube 34 extends through an aperature (not shown) in the sleeve 24 and longitudinally through the annular space 36 provided between the mandrel 12 and sleeve 24 as clearly shown in FIG. 1. The tube 34 extends from the exterior of the unit 10, through the chamber 36 and through an aperture 38 provided in the head member 16 to provide a passageway from the exterior of the unit 10 to the chamber 18.

Whereas only one of the tubes 34 is depicted in the drawings, it is to be understood that a plurality of the tubes 34 may be circumferentially spaced around the mandrel 12 and in chamber 36, if desired.

Of course, the aperture 38 is preferably in sealing engagement with the outer periphery of the tube 34 extending therethrough.

When it is desired to insulate the outer periphery of the pipe 14, and particularly a pipe line comprising a plurality of the pipes 14 secured together in tandem relation, a plurality of the units 10 are spaced along the pipe line at the time of installation there. For example, a unit 10 may be inserted over a pipe section immediately prior to the welding of the pipe section to the next succeeding pipe section, with the units 10 being spaced approximately two hundred feet apart. The initial unit 10, such as shown in FIGS. 1 and 2 herein, is installed on the first pipe section 14 and over the normal open end 42 thereof in such a manner that the end closure member 30 is disposed against the open end 42, and preferably "jammed" thereon in such a manner that the opend end 42 of the pipe 14 is slightly embedded in the closure member 30. In addition, it may be desirable to provide a slight pressure from the hand of an operator during the initial steps of the insulating operation to maintain the end closure 30 securely in position.

The components of the foam are mixed together with the appropriate catalysts exteriorly of the unit 10 in any well known manner (not shown) and introduced into the tube 34. For example, suitable urethane spray equipment such as that shown in R. E. Carlson Pat. No. 3,417,923, issued Dec. 24, 1968, and entitled 'Spray Gun for Applying a Two-Component Mixture" or that manufactured and sold by the Gusmer Corporation, and disclosed in their brochure entilted "Spray a Profit" may be suitably connected with the tube 34 for admitting the foam material thereto. This foam supplying equipment may be moved along the pipe 14 in any suitable well known manner (not shown) during the insulating operation. The mixture passes through the tube 34 relatively rapidly for discharge into the chamber 18 particularly when it is considered that the overall length of the mandrel 14 is relatively short. The foam "sets up" relatively quickly and accumulates in the chamber 18 around the outer periphery of the pipe 14.

This type of foam material inherently bonds itself to substantially any material and becomes a permanent part of the structure, and can be applied to substantially any surface or configuration. Consequently, the entire annular or substantially doughnut shaped chamber 18 fills with the foam, which bonds itself to the outer periphery of the pipe and the inner periphery of the sleeve 24. As the supply of foam components continues to move through the tube 34, the foam accumulating around the pipe 14 as shown at 38 in FIG. 2 of this general doughnut shape acts against the head member 16 for moving the head member longitudinally along the pipe 14 in the direction indicated by the arrow A. Of course, the mandrel 12 and ring 20 move simultaneously along the pipe 14 with the head 16. The tapered leading edge 22 of the ring 20 facilitates the movement or passage of the head member 16 through the sleeve 24. As the head 16 moves through the sleeve 24, the sleeve is "smoothed out" over the accumulation of foam 38 as shown at 40 in FIGS. 2 and 3. The mandrel 12 and head 16 continue to move along the pipe 14 while the foam 38 accumulates around the outer periphery of the pipe 14 for efficiently filling the annular space between the pipe 14 and the sleeve 24, thus providing an insulation coating around the outer periphery of the pipe while simultaneously providing a seamless plastic tube or jacket over the outer periphery of the foam.

Figure 4:
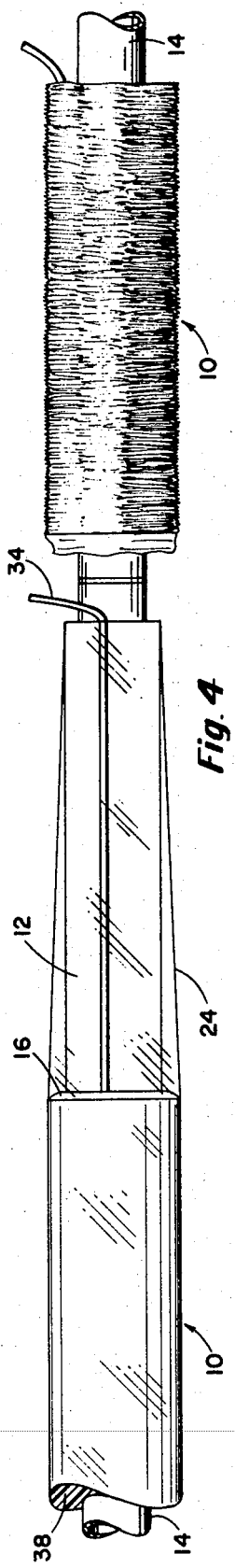
FIG. 4 is a view similar to FIG. 3 depicting a further stage of the insulating operation.

When the mandrel 12 has moved along the pipe 14 through a sufficient distance for "unfolding" the entire length of the sleeve or tube 24, for example through a distance of approximately two hundred feet, as shown in FIG. 4, the forward movement of the mandrel 12 will be stopped, and the application of the foam components into the tube 34 will be ceased. The foam 38 will be applied around the outer periphery of the pipe 14 behind the head 16 and the foam will be covered with the sleeve 24 as shown at 40 in FIG. 4, and the remaining portion of the sleeve 24 (which will be a relatively short portion thereof) will be substantially stretched between the head 16 and the outer end of the mandrel 12.

Since the mandrel 12 and the tube 34 are expendable, the mandrel 12 and the tube 34 and that portion of the sleeve 24 extending thereover may be cut away from the head member 16 and slit along the longitudinal dimension or length thereof and removed from the pipe for discard. The free end of the sleeve 24 may then be secured around the outer periphery of the head 16 or around the outer periphery of the foam 38 in any suitable manner such as by taping or the like (not shown). Of course, in the event the sleeve 24 is secured around the mandrel 12 by means of a slidable connection, the head 16 will continue to move along the pipe 14 until the head member 16 approaches or reaches the outer end of the sleeve 24, at which position suitable stop means (not shown) may be provided for limiting the movement of the head 16.

Figure 5:
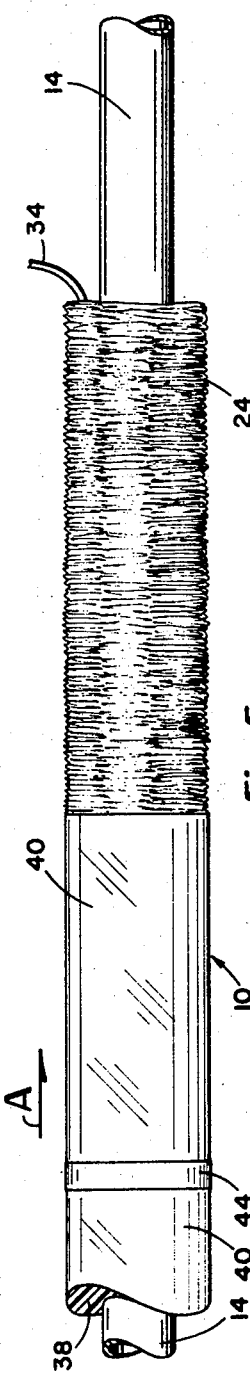
FIG. 5 is a view similar to FIG. 3 and depicting a still further stage of the insulating operation.

When the initial unit 10 has been utilized for the insulating operation and has reached the position shown in the left hand side of FIG. 4, the first unit 10 will be in the proximity of the next succeeding unit 10 which has been previously installed on the pipe 14 as hereinbefore set forth. The end portion of the sleeve 24 disposed around the head 16 of the next succeeding unit 10 will be in the proximity of the expended cartridge or unit 10, and this end of the sleeve 24 is manually pulled over the sleeve 24 of the first unit 10 which has been stretched over the foam 38. The sleeve 24 of the next succeeding unit 10 is then secured to the sleeve 24 of the first unit 10 in any suitable manner, such as by suitable adhesive or pressure sensitive tape 44, as shown in FIG. 5, and the next succeeding unit 10 is ready to be utilized for continuing the insulating operation.

Figure 6:
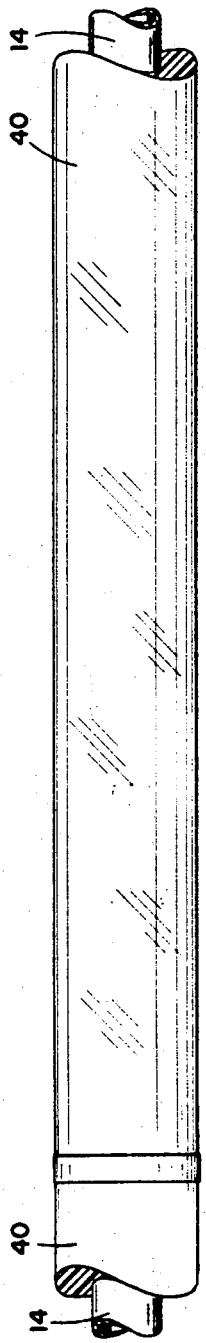
FIG. 6 is a broken elevational view of a pipe line which has been insulated by the method and means of the invention.

As hereinbefore set forth, the components of the foam material are admitted to the tube 34 of the next succeeding unit 10, and the operation is repeated and continued until the entire pipe line has been insulated and the insulation covered by the seamless plastic film 24, as shown in FIG. 6, with the only "joints" in the outer jacket or plastic tubing being the taped joints 44 spaced along the pipe at approximately two hundred feet intervals therealong. Of course, it is to be noted that the length of the sleeve 24 provided on the mandrel 12 may be substantially any desired dimension, corresponding to the thickness of the film and the length of the mandrel, and the approximate dimensions utilized herein by way of example are not intended to limit the invention thereto. In addition, it is to be understood that the components of the foam may be directed through the unit 10 independently to a suitable mixer head (not shown) provided in the chamber 18, if desired, or the components may move independently through substantially the entire length of the unit 10 and be mixed just prior to discharge into the chamber 18.

Referring now to FIGS. 7, 8 and 9, a modified form of the invention is depicted which comprises a unit or cartridge generally indicated at 50 for moving along a pipe or pipe line to insulate the pipe and simultaneously apply an outer jacket over the insulation material in a manner generally similar as that hereinbefore set forth. The embodiment shown in FIGS. 7, 8 and 9 is particularly designed and constructed for applying the insulating and outer jacket to pipes having larger diameters, but is not limited thereto.

The unit 50 comprises a mandrel 52 similar to the mandrel 12 for receiving the pipe 14a therethrough and having a head unit 54 at one end thereof and a seamless plastic film sleeve or tube 56 disposed therearound generally similar to the sleeve 24 of the preferred embodiment. The head 54 comprises a pair of spaced annular ring members 58 and 60 having longitudinally extending spacer arms 62 and 64 interposed therebetween. An annular seal ring 66 similar to the ring or head member 16 is provided on the outer face of the plate 58 and is secured thereto in any suitable manner (not shown). The ring 58 is in sealing engagement with the outer periphery of the pipe 14a, and the outer periphery of the ring 66 is in sliding engagement with the inner periphery of the sleeve 56, as hereinbefore set forth. The head 54 may be of a split configuration and hinged as is well known for facilitating disposition thereof on the pipe 14a in a transverse direction, if desired.

A pair of lever arms 66' and 68 are pivotally secured to the opposite sides of the spacer arm 62 and are pivotally secured thereto at 70 in any well known manner. A pair of rollers 72 and 74 are journalled on the arms 66' and 68, respectively, for riding longitudinally along the outer periphery of the pipe 14a. A filler plate 76 is welded or otherwise secured between the outer ends of the arms 66' and 68 and a helical spring member 78 is mounted thereon in any well known manner for bearing against the arm 62 and maintaining the rollers 72 and 74 in constant engagement with the outer periphery of the pipe 14a. In addition, a plurality of rollers 80 are journalled on the spacer arms 64 and are in constant engagement with the outer periphery of the pipe 14a as particularly shown in FIG. 9.

An air relief valve assembly generally indicated at 8 is also provided in the head 54, and is omitted in FIGS. 8 and 9 for purposes of illustration. The valve assembly 82 comprises a guide shaft 84 secured to an arm 64 (which is omitted in FIG. 7 for purposes of illustration) by a pair of support blocks 86 and 88. The rod 84 extends slidably through the blocks 86 and 88, and a pair of spaced stop nuts 90 and 92 are secured to the rod and spaced on opposite sides of the block 88. This limits the travel of the rod 84 in both directions. The stop 92 is preferably adjustably secured on the rod 84 in any well known manner (not shown), and a suitable helical spring 94 is disposed around the rod 84 and anchored between the block 86 and the stop 92 for constantly urging the rod 84 in a direction toward the plate 58. In addition, the stop member 90 is adapted for intermittent engagement with a vent duct 96 secured to the plate 58 and extending therethrough for providing open communication between the opposite sides of the plate 58. The pressure of the spring 94 maintains the stop member 90 in a normally engaged position against the vent duct 96. However, when the pressure in the chamber 98 surrounding the pipe 14a and acting on the opposite end of the vent duct becomes greater than the force of the spring 94, the stop member 90 will be moved away from the vent duct 96 for bleeding off the excessive pressure for a purpose as will be hereinafter set forth.

A plurality of delivery tubes or hoses 100 extend longitudinally through the annulus between the inner periphery of the mandrel 52 and the outer periphery of the pipe 14a and through the head assembly 54 to provide communication between a service manifold generally indicated at 102 and valving manifold and mixer 104 secured to the plate 58 as particularly shown in FIG. 7. The valving manifold and mixer 104 may be of any well known type and is in communication with a plurality of dispensing nozzle assemblies 106 which are disposed within the chamber 98. Whereas two of the nozzle assemblies 106 are depicted in FIG. 8, it is to be understood that substantially any desired number of the nozzles 106 may be provided. The service manifold 102 may of any suitable well known type device such as widely used in the application of spray materials in the pipe line coating industry, and receives the components of the foam insulating material from the usual servicing equipment (not shown) and as is well known in the industry. The components of the foam insulating material normally include a resin, a curing agent, and a solvent, all of which are delivered independently through the passageways 100, and in addition an air stream is also delivered through one of the passageways 100. The foam components are mixed in the valving manifold and mixer 104 and are delivered to the nozzles 106 simultaneously with a supply of air which aerates the material and sprays the mixture into the chamber 98.

The service manifold is disposed on the pipe 14a in the proximity of the unit 54 as shown in FIG. 7 and is retained in position thereon by a plurality of rollers 108 and a counterweight member 110, as is well known. Subsequent to the complete use of one unit 54 during an insulating operation, the service manifold may be removed from the position adjacent the spent or used unit 54 and replaced on the pipe in the proximity of the next succeeding unit 54, as will be hereinafter set forth.

When it is desired to apply a foam insulation to the outer periphery of the pipe 14a and simultaneously provide a seamless plastic jacket over the applied insulation, a plurality of the units 50 may be installed on the pipe 14a as set forth in the preferred embodiment. The coating operation with the unit 50 is generally similar to that hereinbefore set forth. The components of the foam insulation and an air stream are directed from the service manifold 102 to the valving manifold and mixer 104 and the mixture and the air stream is directed to the foam dispensing nozzles 106 in the chamber 98. The foam is sprayed into the chamber 98 and accumulates therein, as shown at 112 in FIG. 7. As the foam 112 accumulates in the chamber 98, the air used in the spraying operation will also accumulate therein and the force of the air against the seal member 66 will move the head assembly 54 along the pipe 14a in the direction of the service manifold 102 in much the same manner as the head 16 is moved in the embodiment hereinbefore set forth.

As the assembly 54 moves along the pipe 14a, the sleeve 56 will be unfolded and drawn over the outer periphery of the applied foam 112 as set forth in the first embodiment, and the operation is continued until the entire length of the plastic sleeve 56 has been thus unfolded. The mandrel 52 may then be cut away and discarded as hereinbefore set forth, and the head assembly 54 may be removed for use with another unit 50. In addition, the service manifold 102 may be removed from the pipe 14a and repositioned thereon in a similar relationship to the next succeeding unit 50 whereupon the operation may be continued until the entire pipe 14a has been coated with the foam insulation, and the plastic sleeve provided thereover. Of course, the adjacent or overlapping ends of the adjacent sleeve 56 may be sealed as hereinbefore set forth.

From the foregoing it will be apparent that the present invention provides a method and means for applying a foam insulation around the outer periphery of a pipe while simultaneously applying a seamless plastic outer sleeve or jacket over the applied insulation. The novel apparatus comprises a cartridge having an expendable mandrel adapted for disposition around the pipe, and a length of plastic tubular film folded therearound. A head member is provided on the mandrel and in sealing engagement with the outer periphery of the pipe whereby the ingredients or foam mixture may be discharged into the annular chamber around the pipe in communication with the head member for moving the cartridge along the pipe as the foam accumulates in the annular chamber, simultaneously unfolding the sleeve and pulling the sleeve over the applied foam insulation material. The novel method and means for insulating the pipe is simple and efficient and economical in construction.

Whereas the present invention has been described in particular relation to the drawings attached hereto, it should be understood that other and further modifications, apart from those shown or suggested herein, may be made within the spirit and scope of this invention.

What is claimed is:

1. An apparatus for simultaneously applying insulation to the outer periphery of a pipe and covering the applied insulation with a seamless outer jacket, and comprising mandrel means disposed around the pipe for relative longitudinal movement therebetween, head means carried by the mandrel and in sealing engagement with the outer periphery of the pipe, seamless sleeve means disposed around the mandrel means and head means and of a length greater than the length of the mandrel means and head means, passageway means extending longitudinally through the apparatus to direct the insulation material from the exterior of the apparatus to the exposed face of the head means whereby the insulation accumulates around the outer periphery of the pipe, said head means being responsive to the said accumulation of insulation material for moving the mandrel means along the pipe for stretching the sleeve means over the accumulated insulation material to simultaneously provide said outer jacket covering said applied insulation.

2. An apparatus for simultaneously applying insulation to the outer periphery of a pipe and covering the applied insulation with a seamless outer jacket as set forth in claim 1 wherein the insulation is polyurethane foam.

3. An apparatus for simultaneously applying insulation to the outer periphery of a pipe and covering the applied insulation with a seamless outer jacket as set forth in claim 1 wherein the outer jacket is a seamless plastic film tube.

4. An apparatus for simultaneously applying insulation to the outer periphery of a pipe and covering the applied insulation with a seamless outer jacket as set forth in claim 1 wherein the mandrel means is expendable.

5. An apparatus for simultaneously applying insulation to the outer periphery of a pipe and covering the applied insulation with a seamless outer jacket as set forth in claim 1 wherein the passageway means comprises at least one tube member extending longitudinally in the annulus between the mandrel means and the sleeve means for carrying the insulation material to said one face of the head means for applying the insulation material around the outer periphery of the pipe.

6. An apparatus for simultaneously applying insulation to the outer periphery of a pipe and covering the applied insulation with a seamless outer jacket as set forth in claim 1 wherein the head means comprises an annular flexible ring member having the inner periphery thereof in sealing engagement with the inner periphery of the outer jacket.

7. An apparatus for simultaneously applying insulation to the outer periphery of a pipe and covering the applied insulation with a seamless outer jacket as set forth in claim 6 wherein the head means includes cartridge means carried by the mandrel means, said ring member carried by the cartridge means, roller means provided on the cartridge means for facilitating movement thereof along the pipe, spray nozzle means carried by the cartridge means and in communication with the passageway means for receiving the insulation material therefrom and delivering the insulation material to said exposed face of the head means, and bleed valve means provided on the cartridge for precluding build up of excessive pressure on said exposed face of the head means.

8. A method of applying insulation around the outer periphery of a pipe and simultaneously covering the applied insulation with a seamless outer jacket which comprises providing a substantially sealed annular chamber around the pipe, directing an insulating foam material into the annular chamber for an accumulation of the material therein, expanding the length of the chamber as the insulation material accumulates therein, pulling a seamless jacket over the applied insulation material simultaneously with the expansion of the length of the chamber, and sealing the opposite ends of the seamless sleeve.

9. A method of applying insulation around the outer periphery of a pipe and simultaneously covering the applied insulation with a seamless outer jacket as set forth in claim 8 wherein the insulation is a polyurethane foam.

10. A method of applying insulation around the outer periphery of a pipe and simultaneously covering the applied insulation with a seamless outer jacket as set forth in claim 9 wherein the components of the foam are mixed prior to discharge thereof into the annular chamber.

11. A method of applying insulation around the outer periphery of a pipe and simultaneously covering the applied insulation with a seamless outer jacket as set forth in claim 10 wherein the foam mixture is sprayed into the annular chamber.

12. A method of applying insulation around the outer periphery of a pipe and simultaneously covering the applied insulation with a seamless outer jacket as set forth in claim 8 wherein the seamless outer jacket is a seamless plastic film tube.

13. A method of applying insulation around the outer periphery of a pipe and simultaneously covering the applied insulation with a seamless outer jacket as set forth in claim 8 wherein the leading portion of said insulating material in the annular chamber is of a generally doughnut shaped configuration and moves longitudinally along the pipe for expanding the length of the chamber.

14. An apparatus for simultaneously applying insulation to the outer periphery of a pipe and covering the applied insulation with a seamless outer jacket, and comprising mandrel means disposed around the pipe for movement longitudinally therealong, head means carried by the mandrel means and in sealing engagement with the outer periphery of the pipe, seamless sleeve means disposed around the mandrel means and head means and of a length greater than the length of the mandrel means and head means, means for directing the insulation material from the exterior of the apparatus to the annular space between the outer periphery of the pipe and the seamless sleeve and moving said insulation along the outer periphery of the pipe with the leading portion thereof in a generally doughnut shaped configuration, said moving doughnut stretching the sleeve means thereover and over the accumulated insulation behind the doughnut to simultaneously provide said outer jacket covering said applied insulation.

References Cited

UNITED STATES PATENTS

| | | | |
|---|---|---|---|
| 3,439,075 | 4/1969 | Bauer et al. | 264—45 |
| 3,444,279 | 5/1969 | Dost | 264—45 |
| 3,366,719 | 1/1968 | Leuders | 156—79 X |
| 3,118,800 | 1/1964 | Snelling | 156—79 |
| 3,480,493 | 11/1969 | Bauer et al. | 156—78 |

FOREIGN PATENTS

| | | | |
|---|---|---|---|
| 1,075,463 | 7/1967 | Great Britain | 264—45 |

DANIEL J. FRITSCH, Primary Examiner

U.S. Cl. X.R.

156—79, 87, 229, 244, 294, 381, 392, 423, 494, 500; 264—45, 47 262